Dec. 2, 1924.
W. W. HICKS
ELECTRIC HEATER
Filed July 17, 1922
1,518,067
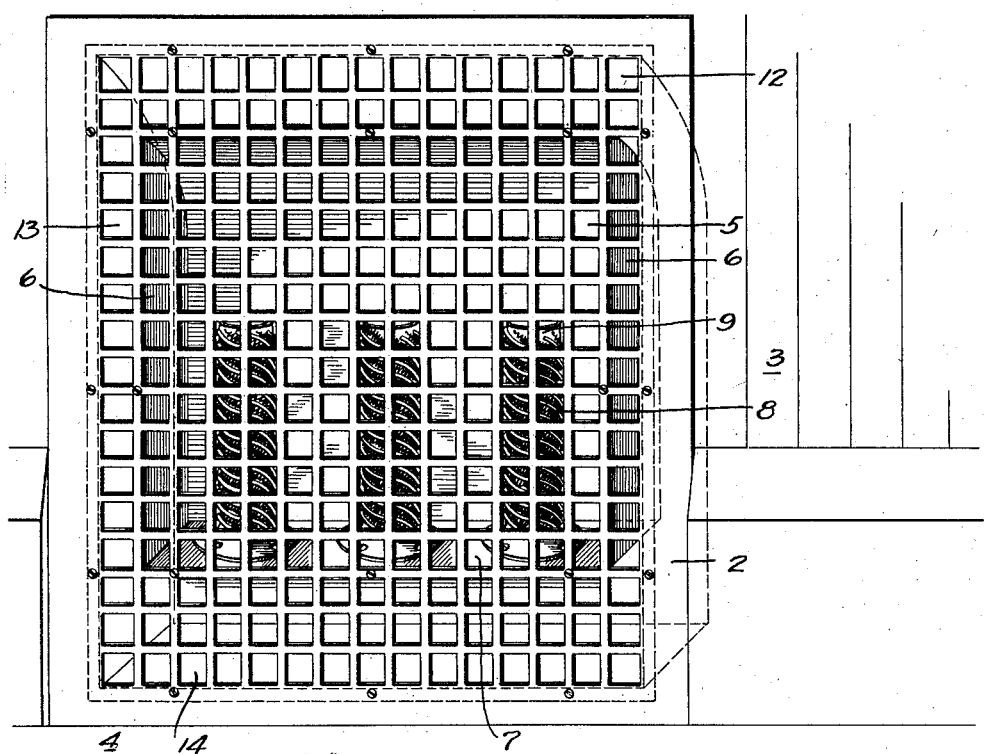
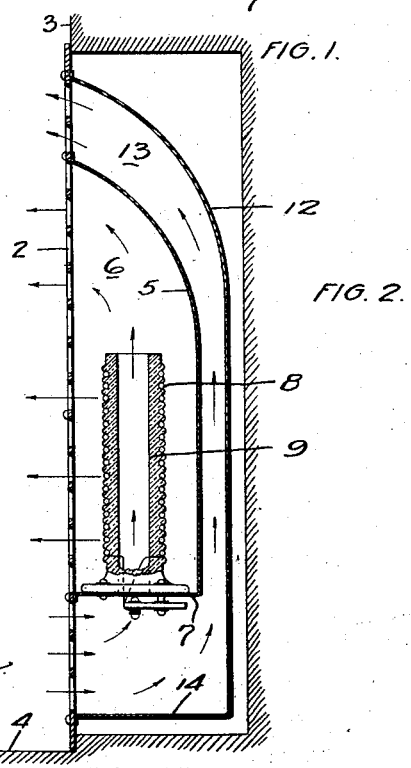
FIG. 1.
FIG. 2.
Witness.
H. Sherburne
INVENTOR.
W. Wesley Hicks.
BY White Prest & Evans
his ATTORNEYS.

Patented Dec. 2, 1924.

1,518,067

UNITED STATES PATENT OFFICE.

WILLIAM WESLEY HICKS, OF SAN FRANCISCO, CALIFORNIA.

ELECTRIC HEATER.

Application filed July 17, 1922. Serial No. 575,543.

*To all whom it may concern:*

Be it known that I, WILLIAM WESLEY HICKS, a citizen of the United States, and a resident of the city and county of San Francisco, State of California, have invented a certain new and useful Electric Heater, of which the following is a specification.

The invention relates to electric heaters and particularly to heaters adapted to be arranged in a wall adjacent the floor, to heat a room.

An object of the invention is to provide a wall type electric heater which operates to direct all of the heat produced, into the room.

Another object of the invention is to provide an electric heater which will produce a more or less uniform temperature throughout the room, instead of concentrating the heat in one particular locality.

Another object of the invention is to provide an electric heater which distributes the heat produced, by radiation and by convection.

The invention possesses other advantageous features, some of which, with the foregoing, will be set forth at length in the following description, where I shall outline in full, that form of the invention which I have selected for illustration in the drawings accompanying and forming part of the present specification. In said drawings I have shown one form of heater embodying my invention, but it is to be understood that I do not limit myself to such form, since the invention, as set forth in the claims, may be embodied in a plurality of forms.

Referring to said drawings:

Figure 1 is a perspective view of the heater of my invention installed in a wall.

Fig. 2 is a vertical section of the heater installed in a wall.

The heater of my invention is particularly adapted to be installed in a wall or floor with the front plate or grill of the heater substantially flush with the wall or floor. The grill serves as a guard, to prevent contact with the heating elements and preferably acts as a support for the other elements of the heater. The heat produced by the passage of current through the heating elements is directed into the room by radiation, both direct and reflected, and by convection, provision being made for circulating air around and through the heater. The heat establishes a draft which causes a large amount of air to circulate through and around the heater and this large amount of air, directed into the room, quickly and uniformly raises the temperature of the room. The circulating air also acts as a heat insulator, to prevent those parts of the heater which are disposed adjacent or in contact with the woodwork of the wall, from reaching a dangerous or objectionable temperature.

The heater comprises a metal grill plate 2 which sets against and covers an opening in the wall 3, the opening being preferably formed adjacent the floor 4. Secured to and mounted on the grill is a reflector or inner shell 5 having side walls 6 and a bottom wall 7, the reflector being preferably curved forward toward its upper edge. The reflector is of lesser area than the grill, the bottom, top and side walls thereof being spaced from the corresponding edges of the grill, to provide an area of grill opening all around the reflector. This area is preferably larger at the bottom of the reflector than at the top, for reasons which will hereinafter appear.

Arranged in front of the reflector and behind the grill and preferably on the bottom 7 of the reflector are one or more electric heating elements 8. These elements preferably comprise hollow, vertically disposed, refractory cores 9 on which the resistance wire is arranged, in the present construction, a helix of resistance wire being arranged spirally on the core, which is provided with spiral ridges to separate the various convolutions of the spiral. One continuous wire is preferably employed as the resistance element, this wire passing upward in one spiral groove, downward in the adjacent groove and so on, the terminals being arranged below the bottom 7. The service wires are attached to the terminals.

The bottom wall 7 of the reflector is provided with an aperture registering with the passage through the hollow core 9, so that when the core is heated, air is circulated therethrough. The air passes through the grill below the bottom wall 7, up through the hollow cores and is deflected back into the room by the curved upper portion of the reflector.

The reflector 5, being in close relation to the heating elements, becomes very hot, so that it is objectionable and dangerous to permit it to come into contact with any inflammable material. In accordance with my invention, I prevent contact of the reflector with any portion of the building and at the same time convey the heat from the reflector into the room, by convection. Secured to the rear side of the grill adjacent its edges is a back plate or outer shell 12, having sides 13 and a bottom 14. The back plate encloses and is spaced from the reflector forming an air chamber all around the reflector. As the reflector becomes heated, a draft is established in this air space and air flows in through the grill below the reflector, passes up through the air space and thence out through the grill into the room. Since the air entering the lower part of the grill passes up through the hollow heating elements and up through the air space, the air intake area is preferably larger than the air outlet space between the top of the reflector and the top of the back plate. A large volume of air passes through the space behind the reflector and into the room, thus keeping the back plate cool and causing the discharge into the room of a large amount of warm air which quickly and uniformly heats the room.

I claim:

1. An electric heater comprising an inner shell of heat conducting material having a back wall and a forwardly inclined top wall, an electric heating element disposed in front of the back wall and below the top wall, an outer shell surrounding and spaced from the back and top walls of the inner shell, the top wall of the outer shell being forwardly inclined, the inner and outer shells forming a vertically disposed air flue, through which a substantial current of air is induced to flow by the heat conducted thereto by the heat conducting inner shell, the upper portion of the flue being confined between forwardly inclined walls so that the heated air flows without rest and without interference through the flue.

2. An electric heater comprising an inner shell, having an aperture in its bottom, a hollow electric heating element arranged on said bottom in registry with said aperture and through which air passes, and an outer shell surrounding and spaced in back of the inner shell, forming, with the inner shell, an air passage open at the top and bottom through which a current of air is induced by heat from the inner shell.

3. An electric heater comprising a grill, an open faced outer shell arranged behind the grill the back wall of the shell being curved forward to the grill at its upper end to guide heated air through the grill, the area of the open face of the shell being substantially co-extensive with the area of the grill, an open faced inner shell of heat conducting material arranged behind the grill and within the outer shell, the back, and top walls of the inner shell being spaced from the corresponding walls of the outer shell to form a flue for the passage of air behind the inner shell and an electric heating element arranged within the inner shell.

4. An electric heater comprising a grill, an outer shell secured to and disposed behind the grill and forming with the grill a closed chamber opening through the grill the back wall of the shell being formed at its top portion in a smooth curve extending forward to the grill to direct heated air through the grill, an open faced inner shell of heat conducting material supported by and disposed behind the grill and forming with the grill a chamber of which the grill forms the front wall, the back, and side walls of the inner shell being spaced from the corresponding walls of the outer shell whereby a passage is formed through which a draught of air is induced by heat from the inner shell, and an electric heating element aranged in the inner shell.

5. An electric heater adapted to set into an aperture in the wall, comprising a grill adapted to lie against the wall and close the said aperture, an inner shell disposed behind said grill, the front edges of the inner shell engaging the grill at points spaced from the edges of the grill whereby grill openings occur between the edge of the shell and the edge of the grill, an electric heating element arranged in the inner shell and an outer shell surrounding and spaced from the inner shell and engaging said grill, said outer shell being of less size than said aperture, so that it is out of contact with the surfaces thereof and the back wall of said outer shell being inclined forwardly at the top, to the grill, to form a smooth channel for the passage of air through the space between the shell and to space the upper portion of the back wall from the top surface of the aperture.

6. An electric heater comprising a grill, an outer shell engaging the grill adjacent its edges and extending backward from the grill and forming a chamber behind the grill, an inner shell engaging the grill arranged within said chamber and spaced from the back plate a greater distance at the bottom than at the top, the bottom of the inner shell being provided with an aperture and a hollow heating element arranged on said bottom and registering with said aperture.

7. An electric heater comprising a grill, an outer shell disposed behind the grill, an inner shell of heat conducting material disposed behind the grill and spaced from the outer shell so that an air passage is formed between the two shells, an electric heating element arranged in the inner shell, heat from said element serving to heat the inner shell and thus cause a draught through said passage whereby a large proportion of the heat generated is distributed by convection, the top walls of the two shells being inclined forwardly to the grill so that the air moving through the passage passes rapidly over the surfaces of the top walls to prevent the accumulation of heat in said walls.

8. An electric heater comprising an open faced inner shell having an aperture in the bottom thereof, a hollow electric heating element disposed in said shell and registering with said aperture so that when the element is hot a draft of air passes through the hollow element and an open faced outer shell surrounding and spaced from the inner shell and forming therewith an air passage through which a draft of air passes when the inner shell is heated by the heating element.

9. An electric heater comprising a vertically disposed hollow heating element, a base on which said element is mounted, the base being provided with an aperture registering with the passage in the hollow heating element, a plate behind said heating element and a back plate spaced from said plate at the top and bottom to permit the flow of air through the space between the plate and the back plate.

10. An electric heater comprising a vertically disposed flue of refractory material, a heating coil mounted on said flue, the heat developed in the coil serving to induce a draft through said flue, a plate arranged behind said flue and a back plate forming with the said plate, an air chamber open at the top and bottom to permit the circulation of air therethrough.

11. An electric heater comprising a grill, a shell mounted on said grill and a vertically disposed heating element having an air passage therethrough through which a draft of air is induced by the heat of the heating element, arranged between the grill and the shell.

12. An electric heater comprising a grill, a plate arranged behind said grill, a vertically disposed flue of refractory material arranged between the plate and the grill, and a heating coil arranged on said flue, the heat produced in the coil serving to cause a draft through the flue.

13. An electric heater comprising an open faced inner shell, a vertically disposed hollow heating element in said shell through which a draft of air is induced by the heat generated in the heating element and an open faced outer shell surrounding and spaced from the inner shell and forming therewith a vertical passage through which a draft of air is induced by an increase in temperature of the inner shell by heat derived from the heating element.

14. An electric heater comprising a grill, a shell arranged behind said grill, a plate in said shell forming a substantially vertical passage with the back wall of the shell, a flue arranged between the plate and the grill and a heating element on the flue, the heat produced in the heating element serving to cause a draught of air through the flue and through the passage.

15. An electric heater comprising a vertically disposed flue, a heating element on said flue, the heat developed in the element serving to induce a draught through the flue, a plate arranged behind the flue and a back plate forming with said plate an air chamber open at the top and bottom to permit the circulation of air therethrough.

16. An electric heater comprising a grill, a vertically disposed flue arranged behind the grill, a heating element associated with said flue, the heat produced in the element serving to cause a draught through said flue, and a back flue spaced from and extending over the top of said first flue.

17. An electric heater comprising a vertically disposed flue, a heating element arranged so that the heat developed therein will cause a draught of air upwardly through the flue and a second flue arranged behind said flue and through which a draught of air is induced by heat derived from the heating element.

In testimony whereof I have hereunto set my hand.

WILLIAM WESLEY HICKS.